United States Patent
Chen

(10) Patent No.: US 10,814,670 B2
(45) Date of Patent: Oct. 27, 2020

(54) LOW-SPEED VEHICLE WHEEL ASSEMBLY

(71) Applicant: XIAMEN LENCO CO., LTD., Xiamen, Fujian (CN)

(72) Inventor: Chun-Feng Chen, Xiamen (CN)

(73) Assignee: XIAMEN LENCO CO., LTD., Xiamen, Fujian (CN)

( * ) Notice: Subject to any disclaimer, the term of this patent is extended or adjusted under 35 U.S.C. 154(b) by 237 days.

(21) Appl. No.: 15/964,000

(22) Filed: Apr. 26, 2018

(65) Prior Publication Data

US 2019/0329588 A1 Oct. 31, 2019

(51) Int. Cl.
| | |
|---|---|
| *B60B 21/06* | (2006.01) |
| *B60B 1/00* | (2006.01) |
| *B60B 1/04* | (2006.01) |
| *B60B 1/12* | (2006.01) |

(52) U.S. Cl.
CPC ............. *B60B 1/006* (2013.01); *B60B 1/042* (2013.01); *B60B 1/12* (2013.01); *B60B 21/066* (2013.01); *B60B 2900/112* (2013.01); *B60Y 2200/13* (2013.01); *B60Y 2200/84* (2013.01)

(58) Field of Classification Search
CPC .. B60B 1/006; B60B 1/06; B60B 1/12; B60B 1/14; B60B 21/066
See application file for complete search history.

(56) References Cited

U.S. PATENT DOCUMENTS

| | | | | |
|---|---|---|---|---|
| 335,964 | A * | 2/1886 | Scheidler | B60B 1/12 301/67 |
| 882,846 | A * | 3/1908 | Sachs | B60B 27/0005 384/544 |
| 936,750 | A * | 10/1909 | Whitney | B60B 11/10 301/38.1 |
| 1,113,449 | A * | 10/1914 | Lane | B60B 9/06 152/32 |
| 1,139,896 | A * | 5/1915 | Murray | B60B 11/06 301/12.1 |
| 1,268,438 | A * | 6/1918 | Smith | H02J 7/20 320/123 |
| 2,431,112 | A * | 11/1947 | Everest | A61G 5/02 280/211 |
| 4,181,365 | A * | 1/1980 | Kawaguchi | B60B 1/10 301/64.202 |
| 4,366,964 | A * | 1/1983 | Farey | A61G 5/02 280/250.1 |
| 6,238,008 | B1 * | 5/2001 | Forsythe | B60B 1/003 301/55 |
| 6,439,671 | B1 * | 8/2002 | Lehnhardt | B21C 23/14 29/894.341 |

(Continued)

*Primary Examiner* — Jason R Bellinger
(74) *Attorney, Agent, or Firm* — Leong C. Lei

(57) ABSTRACT

A low-speed vehicle wheel assembly includes a rim, at least three spokes, connectors, a central bearing seat, and bearings. Outer ends of the spokes are fixedly connected to an inner side wall of the rim through the connectors, respectively. Inner ends of the spokes are fixedly connected to an outer wall of the central bearing seat. The bearings are fitted in bearing holes of the central bearing seat, respectively. Because the rim and the central bearing seat are independent components, each component can be made with an independent mold and assembled according to the diameter of the wheel. The cost of the mold is lower, and the components are more versatile.

3 Claims, 3 Drawing Sheets

(56) References Cited

U.S. PATENT DOCUMENTS

| | | | | |
|---|---|---|---|---|
| 6,588,853 B2 * | 7/2003 | Okajima | ............... | B60B 1/0223 |
| | | | | 29/894.33 |
| 7,562,940 B2 * | 7/2009 | D'Aluisio | ............. | B60B 1/0223 |
| | | | | 301/110.5 |
| 7,651,172 B2 * | 1/2010 | Meggiolan | .............. | B60B 1/023 |
| | | | | 301/110.5 |

* cited by examiner

LOW-SPEED VEHICLE WHEEL ASSEMBLY

BACKGROUND OF THE INVENTION

1. Field of the Invention

The present invention relates to a wheel assembly, and more particularly to a wheel assembly used for a low-speed vehicle.

2. Description of the Prior Art

A conventional low-speed vehicle wheel assembly consists of a rim, a hub, and spokes. For some wheel assemblies used for bicycles or wheelchairs in the market, the rim, the hub and the spokes are integrally formed by using the same material. The entire wheel assembly can only be made of a uniform material and can only be applied to the same size. When the rim is different in size, a new mold is required for the entire wheel assembly, resulting in a high cost.

SUMMARY OF THE INVENTION

The primary object of the present invention is to provide a low-speed vehicle wheel assembly with lower cost and greater versatility.

In order to achieve the aforesaid object, the present invention adopts the following technical solution:

A low-speed vehicle wheel assembly comprises a rim, at least three spokes, connectors, a central bearing seat, and bearings. Outer ends of the spokes are fixedly connected to an inner side wall of the rim through the connectors, respectively. Inner ends of the spokes are fixedly connected to an outer wall of the central bearing seat. The bearings are fitted in bearing holes of the central bearing seat, respectively.

Preferably, the low-speed vehicle wheel assembly further comprises a guard ring. The guard ring is fixedly connected to the inner side wall of the rim through bolts.

Preferably, the central bearing seat is composed of a central seat and at least three connecting seats. Two sides of the central seat are provided with the bearing holes, respectively. The at least three connecting seats are equidistantly spaced and fixed to an outer wall of the central seat. The rim has an inner wall ring protruding inwardly from a middle portion of an inner wall thereof. An outer end of each of the connectors has an engaging groove in cooperation with a corresponding one of the spokes and a plurality of transverse screw holes. The screw holes communicate with the engaging groove. The engaging groove at the outer end of each connector is fitted on the inner wall ring of the inner wall of the rim. Bolts are inserted through the screw holes and screwed with nuts to fix the connectors to the rim. The outer ends of the spokes are insertedly connected to the outer ends of the connectors, respectively. The inner ends of the spokes are insertedly connected to the connecting seats of the central bearing seat, respectively.

After adopting the above solution, the invention comprises a rim, at least three spokes, connectors, a central bearing seat, and bearings. The rim and the central bearing seat are independent components, so they may be made of different materials. Each component can be made with an independent mold and assembled according to the diameter of the wheel. The cost of the mold is lower, and the components are more versatile.

Embodiments of the present invention will now be described, by way of example only, with reference to the accompanying drawings.

DETAILED DESCRIPTION OF THE PREFERRED EMBODIMENTS

Figure 1:
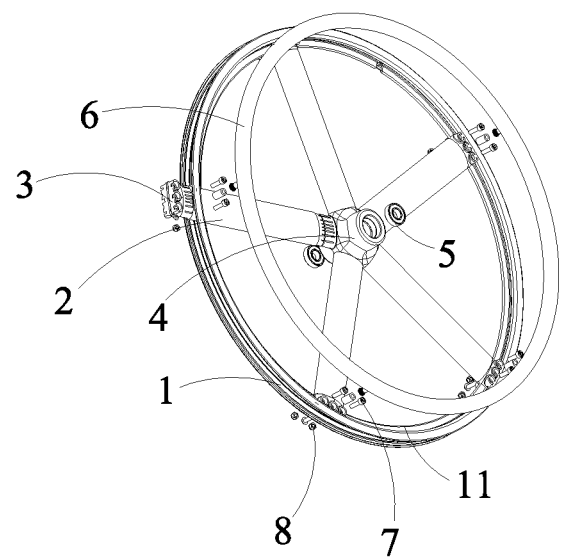
FIG. 1 is an exploded view of the five-spoke wheel in accordance with the present invention.
Figure 2:
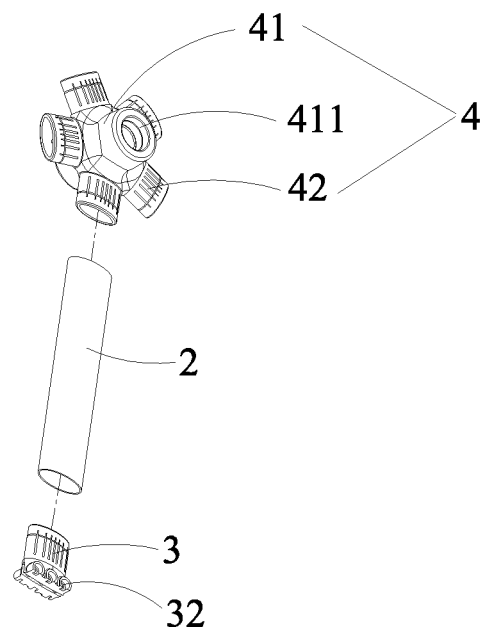
FIG. 2 is a schematic view of the spoke, the connector and the central bearing seat of the five-spoke wheel in accordance with the present invention.

As shown in FIGS. 1 and 2, a low-speed vehicle wheel assembly according to a first embodiment of the present invention, that is, an embodiment of a five-spoke wheel, comprises a rim 1, five spokes 2, connectors 3, a central bearing seat 4, bearings 5, and a guard ring 6.

The central bearing seat 4 is composed of a central seat 41 and five connecting seats 42. Two sides of the central seat 41 are provided with bearing holes 411, respectively. The five connecting seats 42 are equidistantly spaced and fixed to an outer wall of the central seat 41.

Figure 5:
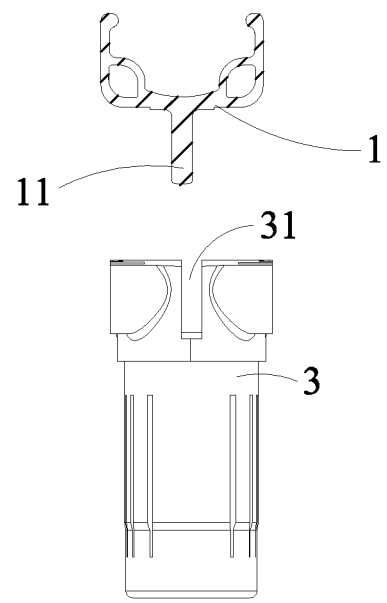
FIG. 5 is an exploded view of the rim and the connector in accordance with the present invention.
Figure 6:
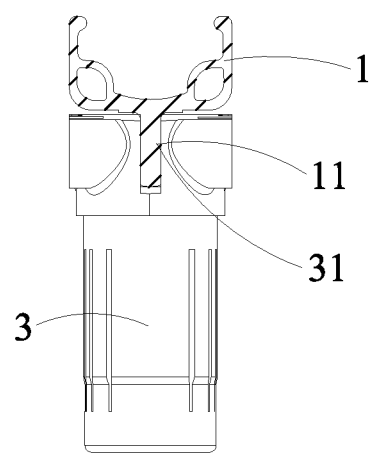
FIG. 6 is a schematic view showing the assembly of the rim and the connector in accordance with the present invention.

Referring to FIG. 5 and FIG. 6, the rim 1 has an inner wall ring 11 protruding inwardly from a middle portion of an inner wall thereof. An outer end of each connector 3 has an engaging groove 31 in cooperation with a corresponding one of the spokes 2 and a plurality of transverse screw holes 32. The screw holes 32 communicate with the engaging groove 31. The engaging groove 31 at the outer end of the connector 3 is fitted on the inner wall ring 11 of the inner wall of the rim 1. Bolts 7 are inserted through the screw holes 32 and screwed with nuts 8 to fix the connectors 3 to the rim 1.

The guard ring 6 is fixedly connected to the connectors 3 fixed on the inner wall of the rim 1 through the bolts 7, so that the guard ring 6 is located at the outer side of the rim 1. The outer ends of the spokes 2 are insertedly connected to the outer ends of the connectors 3, respectively. The inner ends of the spokes 2 are insertedly connected to the connecting seats 42 of the central bearing seat 4, respectively. The outer ends of the connectors 3 are fixedly connected to the inner side wall of the rim 1. The bearings 5 are fitted in the bearing holes 411 of the central bearing seat 4, respectively.

Figure 3:
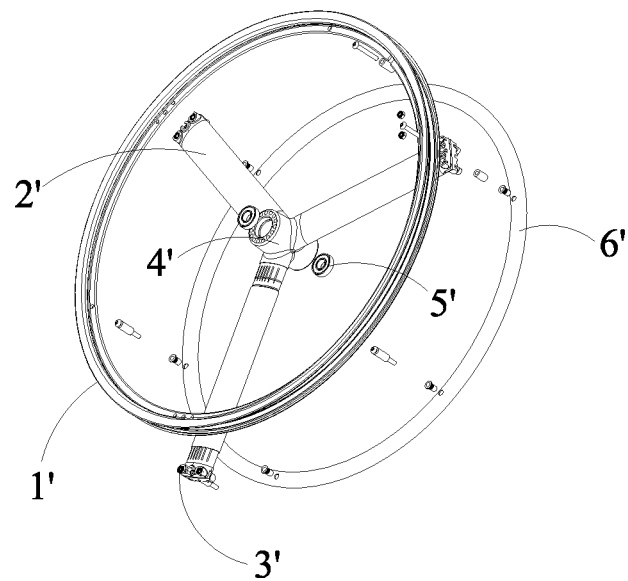
FIG. 3 is an exploded view of the three-spoke wheel in accordance with the present invention.
Figure 4:
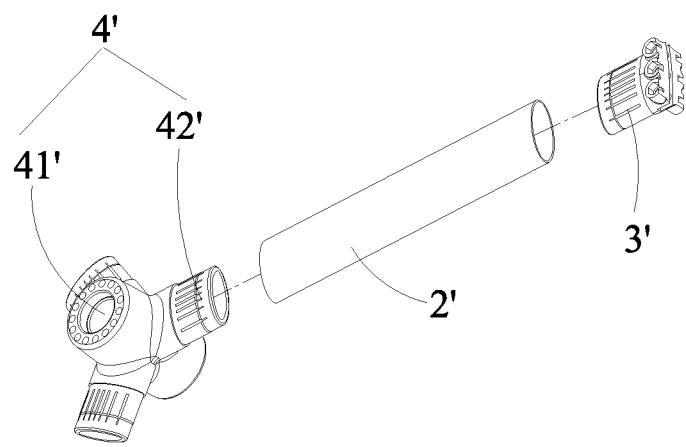
FIG. 4 is a schematic view of the spoke, the connector and the central bearing seat of the three-spoke wheel in accordance with the present invention.

As shown in FIG. 3 and FIG. 4, a low-speed vehicle wheel assembly according to a second embodiment of the present invention, that is, an embodiment of a three-spoke wheel, comprises a rim 1', three spokes 2', connectors 3', a central bearing seat 4', bearings 5', and a guard ring 6'. The second embodiment is substantially similar to the first embodiment with the exceptions described hereinafter. The central bearing seat 4' is composed of a central seat 41' and three connecting seats 42'. The central bearing seat 4' is fixedly connected to the inner side wall of the rim 1' through the three spokes 2'.

The feature the present invention is that the rim, the spokes and the central bearing seat are independent components.

The above description is only the preferred embodiments of the present invention, and the number of spokes may be determined according to the needs.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A low-speed vehicle wheel assembly, comprising a rim, at least three spokes, connectors, a central bearing seat and bearings; outer ends of the spokes being fixedly connected to an inner side wall of the rim through the connectors respectively, inner ends of the spokes being fixedly connected to an outer wall of the central bearing seat, the bearings being fitted in bearing holes of the central bearing seat respectively, wherein the rim has an inner wall ring protruding inwardly from a middle portion of an inner wall thereof and an outer end of each of the connectors has an engaging groove in cooperation with a corresponding one of the spokes, wherein the outer ends of the spokes are connected to the inner wall ring of the rim by the connectors and are spaced from the rim by the connectors and the spokes are indirectly coupled to the rim with the connectors arranged intermediate therebetween.

2. The low-speed vehicle wheel assembly as claimed in claim 1, further comprising a guard ring; the guard ring being fixedly connected to the inner side wall of the rim through bolts.

3. The low-speed vehicle wheel assembly as claimed in claim 1, wherein the central bearing seat is composed of a central seat and at least three connecting seats; two sides of the central seat are provided with the bearing holes respectively, the at least three connecting seats are equidistantly spaced and fixed to an outer wall of the central seat; the outer end of each of the connectors has a plurality of transverse screw holes, the screw holes communicate with the engaging groove, the engaging groove at the outer end of each connector is fitted on the inner wall ring of the inner wall of the rim, bolts are inserted through the screw holes and screwed with nuts to fix the connectors to the rim; the outer ends of the spokes are insertedly connected to the outer ends of the connectors respectively, and the inner ends of the spokes are insertedly connected to the connecting seats of the central bearing seat respectively.

* * * * *